US006202411B1

(12) United States Patent
Yamashita

(10) Patent No.: US 6,202,411 B1
(45) Date of Patent: Mar. 20, 2001

(54) FLOW RATE CONTROL DEVICE IN A HYDRAULIC EXCAVATOR

(75) Inventor: Kouji Yamashita, Hiroshima (JP)

(73) Assignee: Kobe Steel, Ltd., Kobe (JP)

( * ) Notice: Subject to any disclaimer, the term of this patent is extended or adjusted under 35 U.S.C. 154(b) by 0 days.

(21) Appl. No.: 09/362,905

(22) Filed: Jul. 29, 1999

(30) Foreign Application Priority Data

Jul. 31, 1998 (JP) ..................................... 10-230173

(51) Int. Cl.[7] ..................................... F16D 31/02
(52) U.S. Cl. ..................................... 60/445; 60/452
(58) Field of Search ..................................... 60/445, 449, 452

(56) References Cited

U.S. PATENT DOCUMENTS 4,697,418 * 10/1987 Okabe et al. .................... 60/434
5,586,869 * 12/1996 Benckert et al. .................... 60/452 X
5,896,930 * 4/1999 Arai .................... 60/452 X

FOREIGN PATENT DOCUMENTS 6-081773 3/1994 (JP) .

* cited by examiner

*Primary Examiner*—John E. Ryznic
(74) *Attorney, Agent, or Firm*—Oblon, Spivak, McClelland, Maier & Neustadt, P.C.

(57) ABSTRACT

A flow rate control device in a hydraulic excavator, comprising a hydraulic pump which is driven rotatively by an engine, a hydraulic actuator which is driven by a hydraulic oil discharged from the hydraulic pump, a control valve which controls the supply of the hydraulic oil to the hydraulic actuator, an operating means which operates the control valve so as to change over the valve from one position to another, a relief valve disposed in a discharge oil path extending from the hydraulic pump to limit the maximum pressure in the discharge oil path, an operational condition detecting means for detecting an operational condition of the hydraulic actuator, a pump pressure detecting means for detecting the discharge pressure of the hydraulic oil discharged from the hydraulic pump, a flow rate adjusting means for adjusting the discharge flow rate of the hydraulic oil discharged from the hydraulic pump, and a control means to which are inputted detection signals from both the operational condition detecting means and the pump pressure detecting means. When a specific operational condition of the hydraulic actuator is detected and when the said discharge pressure is held at a predetermined relief cut-off pressure or higher for a predetermined period of time, the control means makes control so that the discharge flow rate of the hydraulic oil discharged from the hydraulic pump is decreased to a relief cut-off pressure by the flow rate adjusting means. According to this construction, the relief cut-off control can be made only where required for each of various works of different conditions which the hydraulic excavator performs, such as excavating work, crushing work and land readjusting work. That is, even when the discharge pressure is held at a predetermined relief cut-off pressure or higher for a predetermined period of time, the relief cut-off control is made if the hydraulic actuator is in the specific operational condition.

7 Claims, 6 Drawing Sheets

FLOW RATE CONTROL DEVICE IN A HYDRAULIC EXCAVATOR

BACKGROUND OF THE INVENTION

1. Field of the Invention

The present invention relates to a flow rate control device for use in relief cut-off control in a hydraulic excavator.

2. Description of the Related Art

In a certain hydraulic excavator there is made a control called relief cut-off control in which the discharge flow rate from a pump is decreased when the pump pressure has reached a relief cut-off pressure. Once this relief cut-off control is made, for example when a rock or the like strikes against a bucket during excavating work of the hydraulic excavator and an overload acts on the excavator, it is not only possible to prevent the energy loss of hydraulic oil caused by relief operation but also possible to diminish the relief noise. Besides, there does not occur any shock during relief operation, so it becomes possible to effect smooth operation and it is also possible to improve the heat balance of hydraulic oil and devices.

In the conventional hydraulic excavator, however, the relief cut-off control is made on the basis of only a preset relief pressure of a relief valve. That is, the relief cut-off control is made irrespective of what work and under what conditions the hydraulic excavator is performing.

Generally, it is known that once the relief cut-off control is made, the operator of the hydraulic excavator feels a sense of incongruity or feels as if force were gone, as an inevitable result of decrease in the discharge flow rate from the pump.

In the above conventional hydraulic excavator, the relief cut-off control is made each time the load imposed on a hydraulic actuator increases to a certain degree. Consequently, at every relief cut-off control, a sense of incongruity or an extinct-of-force feeling is given to the operator. As the case may be, it may become impossible to continue operation due to an insufficient pump discharge.

SUMMARY OF THE INVENTION

It is an object of the present invention to provide a flow rate control device capable of making the relief cut-off control only where required for various works of different conditions performed by a hydraulic excavator, including excavating, crushing and land readjusting works.

The flow rate control device in a hydraulic excavator according to the present invention comprises a hydraulic pump which is driven rotatively by an engine, a hydraulic actuator which is driven by a hydraulic oil discharged from the hydraulic pump, a control valve which controls the supply of the hydraulic oil to the hydraulic actuator, an operating means which operates the control valve so as to change over the valve from one position to another, a relief valve disposed in a discharge oil path extending from the hydraulic pump to limit the maximum pressure in the discharge oil path, an operational condition detecting means for detecting an operational condition of the hydraulic actuator, a pump pressure detecting means for detecting the discharge pressure of the hydraulic oil discharged from the hydraulic pump, a flow rate adjusting means for adjusting the discharge flow rate of the hydraulic oil discharged from the hydraulic pump, and a control means to which are inputted detection signals from both operational condition detecting means and pump pressure detecting means. When a specific operational condition of the hydraulic actuator is detected and when the discharge pressure is held at a predetermined relief cut-off pressure or higher for a predetermined period of time, the said control means makes control so that the discharge flow rate of the hydraulic oil discharged from the hydraulic pump is decreased to a relief cut-off pressure by the flow rate adjusting means.

In this case, the relief cut-off control can be made only where required for various works of different conditions performed by the hydraulic excavator, including excavating, crushing and land readjusting works. More specifically, even in the case where the discharge pressure is held at a predetermined relief cut-off pressure or higher for a predetermined period of time, it is required, for execution of the relief cut-off control, that the hydraulic actuator be in a specific operational condition.

The specific operational condition of the hydraulic actuator may be at least either a condition such that an attachment to the hydraulic excavator, which is driven by the hydraulic actuator, is a predetermined type attachment or a condition such that the operating means is operated a predetermined amount or more. In this case, for example, the relief cut-off control can be made only when a special attachment such as a crusher is used or only when a full lever operation or an operation close thereto is performed.

The flow rate control device may be further provided with an engine revolution detecting means for detecting the state of engine revolution and outputting a detected signal to the control means. In this case, when the specific operational condition of the hydraulic actuator is detected and the discharge pressure is held at the predetermined relief cut-off pressure or higher for the predetermined period of time, further, when it is detected by the engine revolution detecting means that the number of revolutions of the engine is in a predetermined high revolution condition, the control means may perform a control so that the discharge flow rate of the hydraulic oil discharged from the hydraulic pump is decreased to the relief cut-off flow rate. The predetermined high revolution condition may indicate either a condition such that the engine revolution is held at a predetermined number of revolutions or higher for a predetermined period of time or a condition such that the operational position of a throttle lever for setting the engine speed is set to a high speed side.

The flow rate control device may be further provided with a work mode setting means for setting drive characteristics of the engine, hydraulic pump, etc. as work modes and inputting a set signal to the control means. In this case, when the specific operational condition of the hydraulic actuator is detected and the discharge pressure is held at the predetermined relief cut-off pressure or higher for the predetermined period of time, further, when a predetermined work mode is set by the work mode setting means, the control means may perform a control so that the discharge flow rate of the hydraulic oil discharged from the hydraulic pump is decreased to the relief cut-off flow rate.

Control may be made so as to decrease the discharge flow rate gradually when decreasing the discharge flow rate of the hydraulic pump to the relief cut-off flow rate or so as to increase the discharge flow rate gradually when canceling the relief cut-off state. In this case, when the relief valve performs a relief cut-off operation during operation of the hydraulic excavator, it is possible to eliminate the "sense of incongruity" or "extinct-of-force feeling" of the operator during operation.

DESCRIPTION OF PREFERRED EMBODIMENTS

Embodiments of the present invention will be described in detail hereunder with reference to the accompanying drawings.

Figure 1:
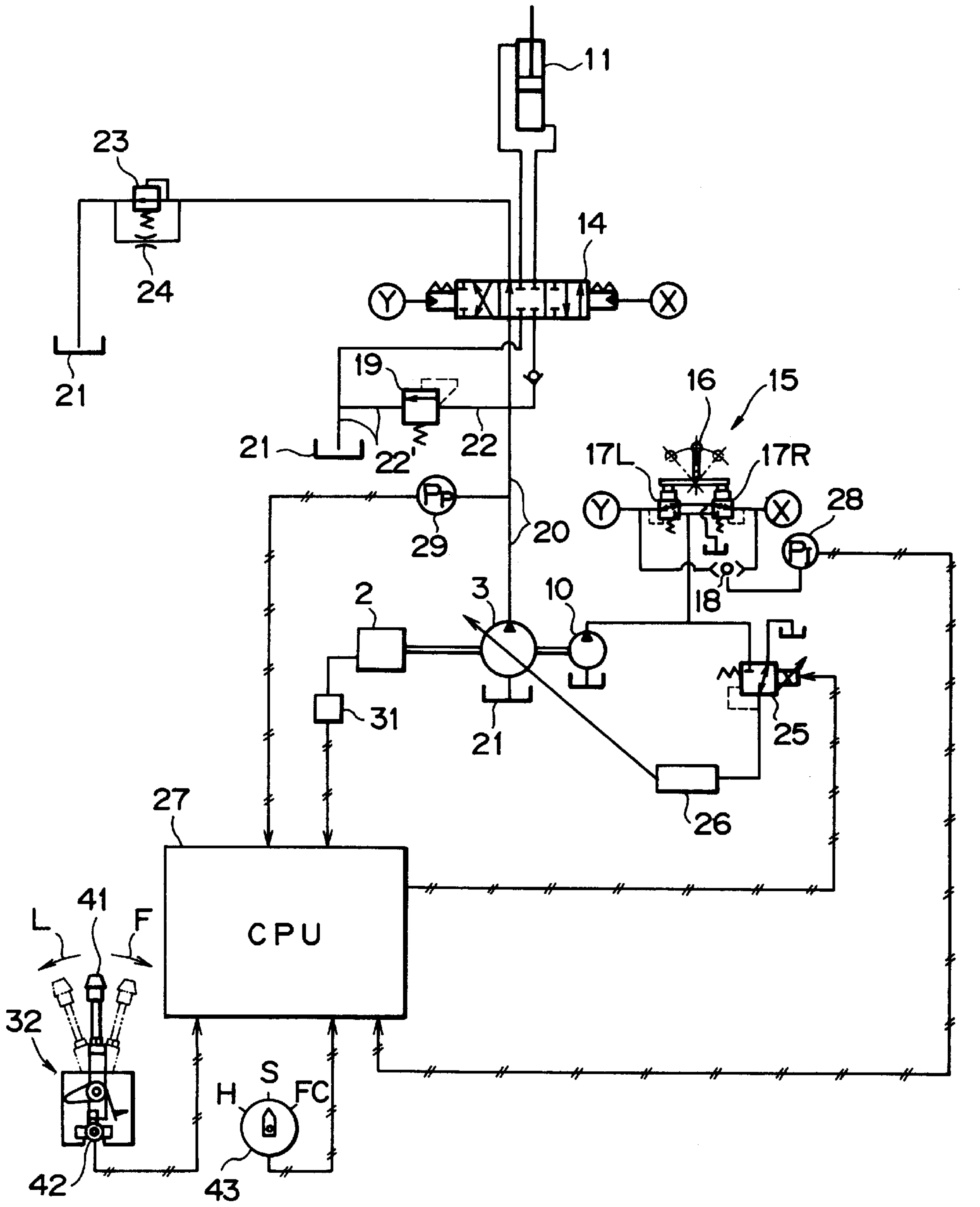
FIG. 1 is a circuit diagram of a flow rate control device in a hydraulic excavator according to the present invention.

FIG. 1 is a circuit diagram of a flow rate control device in a hydraulic excavator according to the present invention. In the same figure, the numeral 2 denotes an engine mounted on the hydraulic excavator, numeral 3 denotes a hydraulic pump which is driven rotatively by the engine 2 and which discharges a hydraulic oil, numeral 10 denotes a pilot pump which discharges a primary pilot pressure, numeral 11 denotes a hydraulic cylinder which is a hydraulic actuator driven by the hydraulic oil discharged from the hydraulic pump 3, numeral 14 denotes a control valve which controls the supply of the hydraulic oil to the hydraulic cylinder 11, numeral 15 denotes a hydraulic remote control valve as an operating means which operates the control valve 14 so as to change over the valve from one position to another, numeral 16 denotes an operating lever for the hydraulic remote control valve 15, numerals 17L and 17R denote pilot valves, numeral 18 denotes a shuttle valve which selects a secondary pilot pressure derived from the pilot valve 17L or 17R, and numeral 19 denotes a relief valve disposed in a line 22–22'extending from a discharge line 20 of the hydraulic pump 3 and leading to an oil tank 21, the relief valve 19 functioning to limit the maximum pressure of the hydraulic oil in the discharge line 20. Further, numeral 23 denotes a low-pressure relief valve for a negative control, numeral 24 denotes a throttling portion connected in parallel with the low-pressure relief valve 23, and numeral 25 denotes an electromagnetic proportional reducing valve serving as an Electro-oil converter. The marks X—X and Y—Y represent pilot line connections.

In FIG. 1, moreover, the numeral 26 denotes a regulator for inclined rotation of a pump swash plate as a flow rate adjusting means which adjusts the discharge flow rate of the hydraulic oil discharged from the hydraulic pump 3 in accordance with an output signal provided from a controller 27 as a control means. Numeral 28 denotes a pilot pressure sensor for detecting an operational condition of the hydraulic remote control valve 15. The pilot pressure sensor 28 acts as one operational condition detecting means. Numeral 29 denotes a pump pressure sensor as a pump pressure detecting means for detecting the discharge pressure in the discharge line 20 of the hydraulic oil discharged from the hydraulic pump 3. Numeral 31 denotes a revolution sensor for detecting the number of revolutions of the engine 2. Numeral 32 denotes a throttle lever device for setting the revolution of the engine 2 to a low speed side (L side) and a high speed side (F side). Numeral 41 denotes a throttle lever used in the throttle lever device 32, numeral 42 denotes a potentiometer for detecting an operational position of the throttle lever 41, and numeral 43 denotes a work mode change-over switch. The work mode change-over switch 43 is for change-over operation which is performed as necessary during operation of the hydraulic excavator to select drive characteristics of the engine 2, hydraulic pump 3, etc. as a required work mode from among such plural work modes of H (heavy load), S (normal load), and FC (Fight load, fine operation). Detected signals from the pilot pressure sensor 28, pump pressure sensor 29, revolution sensor 31, potentiometer 42, and work mode change-over switch 43, or some present values thereof, are inputted to the controller 27 for the control to be made in the invention.

Unlike the prior art wherein the relief cut-off control is sure to be performed when the discharge pressure from the hydraulic pump has reached a predetermined relief-cut pressure, the present invention makes an improvement so that even when the discharge pressure from the hydraulic pump has reached the relief cut-off pressure, the relief cut-off control is not performed unless predetermined certain conditions are satisfied.

Reference will be made below to some examples of such predetermined conditions.

According to the first example (first embodiment), the following two conditions ① and ② are established and the relief cut-off control is made only when both of the two conditions are satisfied:

①: The discharge pressure from the hydraulic pump 3 should be held at a predetermined relief cut-off pressure or higher for a predetermined period of time.

②: The hydraulic actuator should be in a specific operational condition.

The "specific operational condition" in the above condition ② indicates at least one of a condition such that an attachment to the hydraulic excavator driven by the hydraulic actuator is a specific type attachment (say, a crusher) and a condition such that the operating means is operated a predetermined amount or more.

According to the second example (second embodiment), the following condition ③ is established in addition to the above conditions ① and ② and the relief cut-off control is made only when all of these three conditions are satisfied:

③: The number of revolutions of the engine 2 should be in a predetermined high revolution condition.

The "high revolution condition" in the above ③ indicates maintaining the engine speed at a predetermined number of revolutions or higher for a predetermined period of time or indicates that the throttle lever is set to the high speed side.

According to the third example (third embodiment), the following condition ④ is established in addition to the above conditions ① and ② and the relief cut-off control is made when all of these three conditions are satisfied:

④: The work mode change-over switch 43 should be in a state of having selected a predetermined mode (say, the heavy load mode H).

According to the fourth example (fourth embodiment), the relief cut-off control is made only when all of the above four conditions ① to ④ are satisfied:

These first to fourth embodiments will now be described in detail with reference again to FIG. 1. Although FIG. 1 is described as if all of the above conditions ① to ④ were taken into consideration (that is, as if the flow control device shown therein corresponded to the fourth embodiment), this is for the convenience of making reference to FIG. 1 with respect to all of the first to fourth embodiments. As will be seen from the following description, it suffices if only detection values and set values required in each of the embodiments are inputted to the controller 27.

Reference will first be made to the first embodiment. While the hydraulic excavator is in operation, the pump pressure sensor 29 detects the discharge pressure in the discharge line 20 of the discharge oil which is discharged from the hydraulic pump 3. Signals thus detected are inputted to the controller 27 at every generation. The pilot pressure sensor 28 detects a pilot pressure of the hydraulic remote control valve 15 and signals thus detected are inputted to the controller 27 at every generation. On the basis of these detected signal provided from the pilot pressure sensor 28 the controller 27 determines an operation quantity of the hydraulic remote control valve 15. In the case where a predetermined attachment other than an excavating bucket, say, a crusher, is attached to the hydraulic excavator, signals provided from an operating lever, an operating pedal, or an operating switch, (none of them are shown), for operating the attachment are inputted to the controller 27. On the basis of these signals it becomes possible for the controller 27 to judge what attachment is being driven by the hydraulic actuator 11. An operational condition detecting means is constituted by such operating lever, operating pedal, or operating switch, which operates the predetermined attachment, and the pilot pressure sensor 28.

When it is detected by the operational condition detecting means that the hydraulic actuator 11 is in a specific operational condition and if the discharge pressure is held at a predetermined relief cut-off pressure (say 29.4 MPa) or higher for a predetermined period of time (say 1 second), the controller 27 outputs a command value signal to the regulator 26 through the electromagnetic proportional reducing valve 25, which command value signal is for adjusting the discharge flow rate of the hydraulic oil discharged from the hydraulic pump 3. With this command value signal it is possible to decrease the said discharge flow rate to a predetermined relief cut-off flow rate.

The specific operational condition of the hydraulic actuator 11, as noted previously, indicates a condition such that the attachment to the hydraulic excavator driven by the hydraulic actuator 11 has been detected to be a specific type attachment (say a crusher) and/or a condition such that the hydraulic remote control valve is judged to have been operated a predetermined amount or more on the basis of detected signals provided from the pilot pressure sensor 28.

The following description is now provided about the second embodiment in which, in addition to what has been described above in connection with the first embodiment, the number of revolutions of the engine 2 is detected by the revolution sensor 31 and inputted to the controller 27, or an output signal provided from the potentiometer 42 which detects an operational position of the throttle lever 41 is inputted to the controller 27. The revolution sensor 3 or the potentiometer 42 constitutes an engine revolution detecting means.

When the hydraulic actuator 11 is detected to be in a specific operational condition and the discharge pressure is held at a predetermined relief cut-off pressure or higher for a predetermined period of time, and when the engine speed is held at a predetermined number of revolutions or higher for a predetermined period of time, or when the throttle lever 41 is set to the high speed side (F side), the controller 27 outputs a command value signal to the regulator 26 through the electromagnetic proportional reducing valve 25, which command value signal is for adjusting the discharge flow rate of the hydraulic oil discharged from the hydraulic pump 3. With this command value signal, the said discharge flow rate can be decreased to a predetermined relief cut-off flow rate.

Description is now directed to the third embodiment. In addition to the components described in the first embodiment, the flow rate control device of this embodiment is further provided with a work mode change-over switch 43 which sets drive characteristics of the engine 2, hydraulic pump 3, etc. as work modes according to plural types of works. Signals from the switch 43 are inputted to the controller 27. For example, a required work mode can be selected from among a heavy load mode H, a normal load mode S, and a light load, fine operation mode FC.

When the hydraulic actuator 11 is detected to be in a specific operational condition and the discharge pressure is held at a predetermined relief cut-off pressure or higher for a predetermined period of time, and in the case where a predetermined work mode, say the heavy load mode H, is set by the work mode change-over switch 43, the controller 27 outputs a command value signal to the regulator 26 through the electromagnetic proportional reducing valve 25, which signal is for adjusting the discharge flow rate of the hydraulic oil discharged from the hydraulic pump 3. With this command value signal, the discharge flow rate of the hydraulic oil discharged from the hydraulic pump 3 can be decreased to a predetermined relief cut-off flow rate.

It is the fourth embodiment that combines the third embodiment with such conditions on engine revolution as in the second embodiment.

In the above first to fourth embodiments, as a matter of course, after the conditions for the relief cut-off control have been satisfied and the discharge flow rate of the hydraulic oil discharged from the hydraulic pump 3 has been decreased to the relief cut-off flow rate, the controller 27 continues to receive various detected signals and cancels the relief cut-off control if a predetermined time has elapsed outside the conditions for the relief-cut control.

Thus, since the relief cut-off flow rate adjustment is not performed if the predetermined time has elapsed outside the above conditions, it is possible to surely prevent the occurrence of an unnecessary relief cut-off flow rate condition during operation of the hydraulic excavator.

Figure 2:
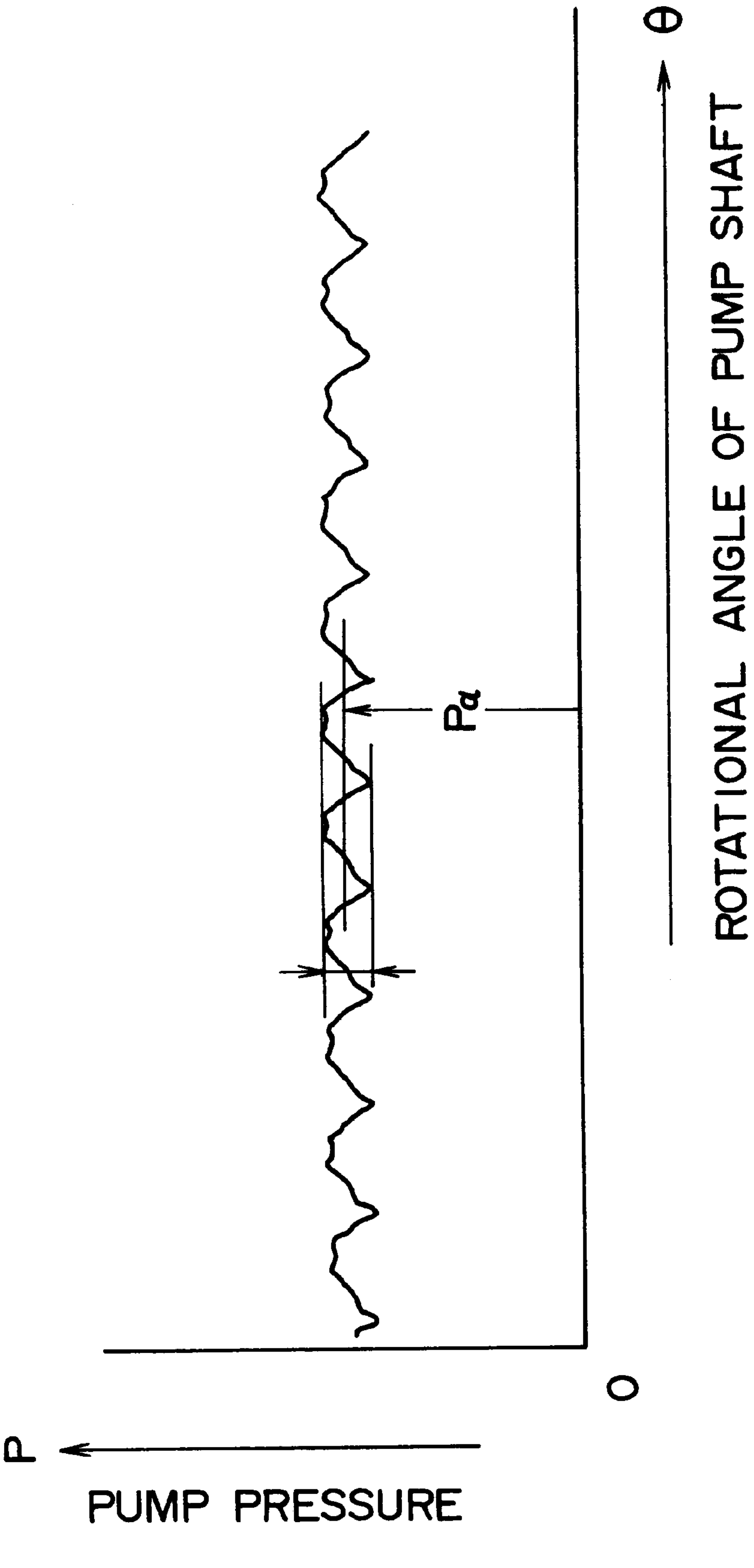
FIG. 2 is a diagram showing the waveform of a discharge pressure from a hydraulic pump.

The following description is now provided about setting a relief cut-off pressure with reference to FIG. 2. FIG. 2 is a diagram showing the waveform of the discharge pressure from the hydraulic pump 3. When the detected signal from the pump pressure sensor 29 represents a predetermined pressure waveform and the state of this pressure waveform continues for a predetermined period of time, and when the detected signal indicates a predetermined pressure or a higher pressure, the controller 27 judges this state to be a relief cut-off state, then calculates a mean value $P_\alpha$ of discharge pressure values in a predetermined time period and determines the above relief cut-off pressure on the basis of the mean value $P_\alpha$. The reason why a mean value is calculated is because discharge pressures involve fine variations and therefore taking an average in a predetermined time period ensures a higher accuracy.

Consequently, when the hydraulic excavator performs a work with a work machine of a different working pressure attached thereto, for example when an ordinary type of an excavating bucket (not shown) is attached as a work machine to the hydraulic excavator and the relief pressure is at 34.3 MPa, or when a rock crusher (not shown) is attached as a work machine to the hydraulic excavator and the relief pressure is set at 24.5 MPa, it is possible to set a relief cut-off pressure freely according to the operation of each work machine. This is very convenient.

Further, the controller 27 counts a second predetermined time (say 10 hr) which is longer than the foregoing predetermined time, then calculates the aforesaid mean value plural times, and determines a relief cut-off pressure on the basis of the highest value out of the plural mean values.

Thus, plural mean values $P_\alpha$ are obtained by calculating the foregoing mean value $P_\alpha$ plural times within the second predetermined time (say 10 hr) and a relief cut-off pressure can be newly established on the basis of the highest value out of the plural mean values $P_\alpha$, therefore, it is possible to prevent the relief cut-off pressure from dropping due to changes with time and control the relief valve 19 so as to perform a normal relief cut-off operation.

Further, upon expiration of the second predetermined time (say 10 hr), the controller 27 sets the relief cut-off pressure decided above as the foregoing predetermined relief cut-off pressure, then clears (pressure=0) a relief cut-off pressure decided after the setting, and newly counts the second predetermined time.

As a result, the mean value $P_\alpha$ of the pump pressure (discharge pressure of the hydraulic pump 3) is checked at all times and the relief cutoff pressure is updated and set on the basis of the maximum relief pressure observed in the case of satisfying the conditions for the existence of a relief state, then, after the updating and setting, the maximum relief pressure is cleared (=0). Thus, the relief valve 19 can be maintained so as to operate at a normal relief cut-off pressure.

Figure 3:
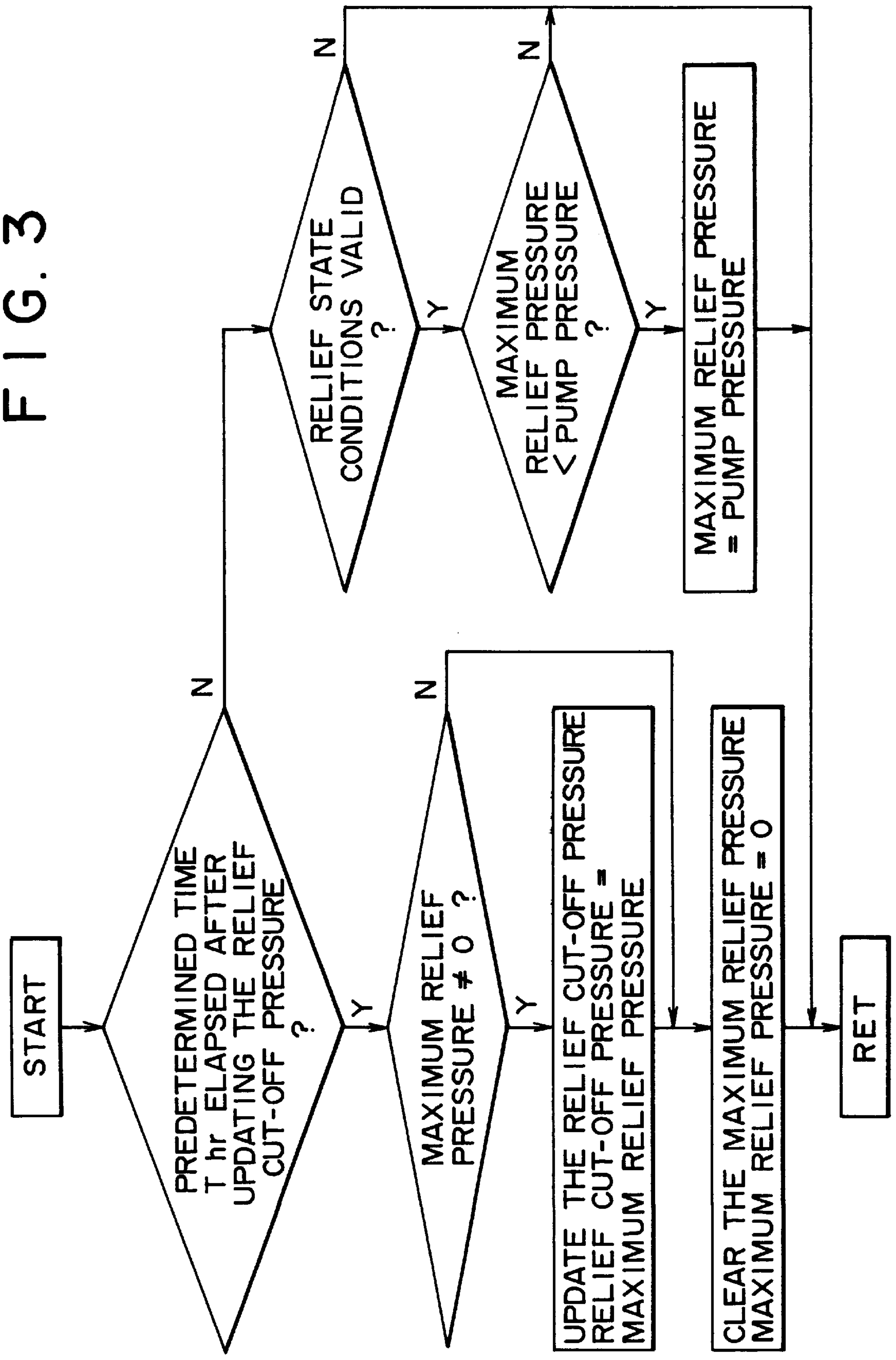
FIG. 3 is a flowchart showing a function related to relief cut-off pressure updating of a controller.

FIG. 3 is a flowchart showing a function related to relief cut-off pressure updating of the controller 27 which makes control for setting a relief cut-off pressure. As the relief pressure of the relief valve 19 drops due to changes with time, a pressure above the pump pressure, as a relief cut-off pressure, is reached and there occurs a case where that pressure is not maintained for a certain time, say, 1 second. To avoid this inconvenience, the controller 27 monitors the pump pressure (several mean values $P_\alpha$ of the pump discharge pressure) of the hydraulic pump 3 at all times and stores the maximum value obtained in the case of satisfying the conditions for the existence of a relief state, as the maximum relief pressure. Then, at every predetermined time (say an operating time of 10 hr) the controller 27 updates the relief cut-off pressure (establishes a relief cut-off pressure on the basis of the maximum relief pressure) and stores it. After the updating, the maximum relief pressure is cleared (=0).

Figure 4:
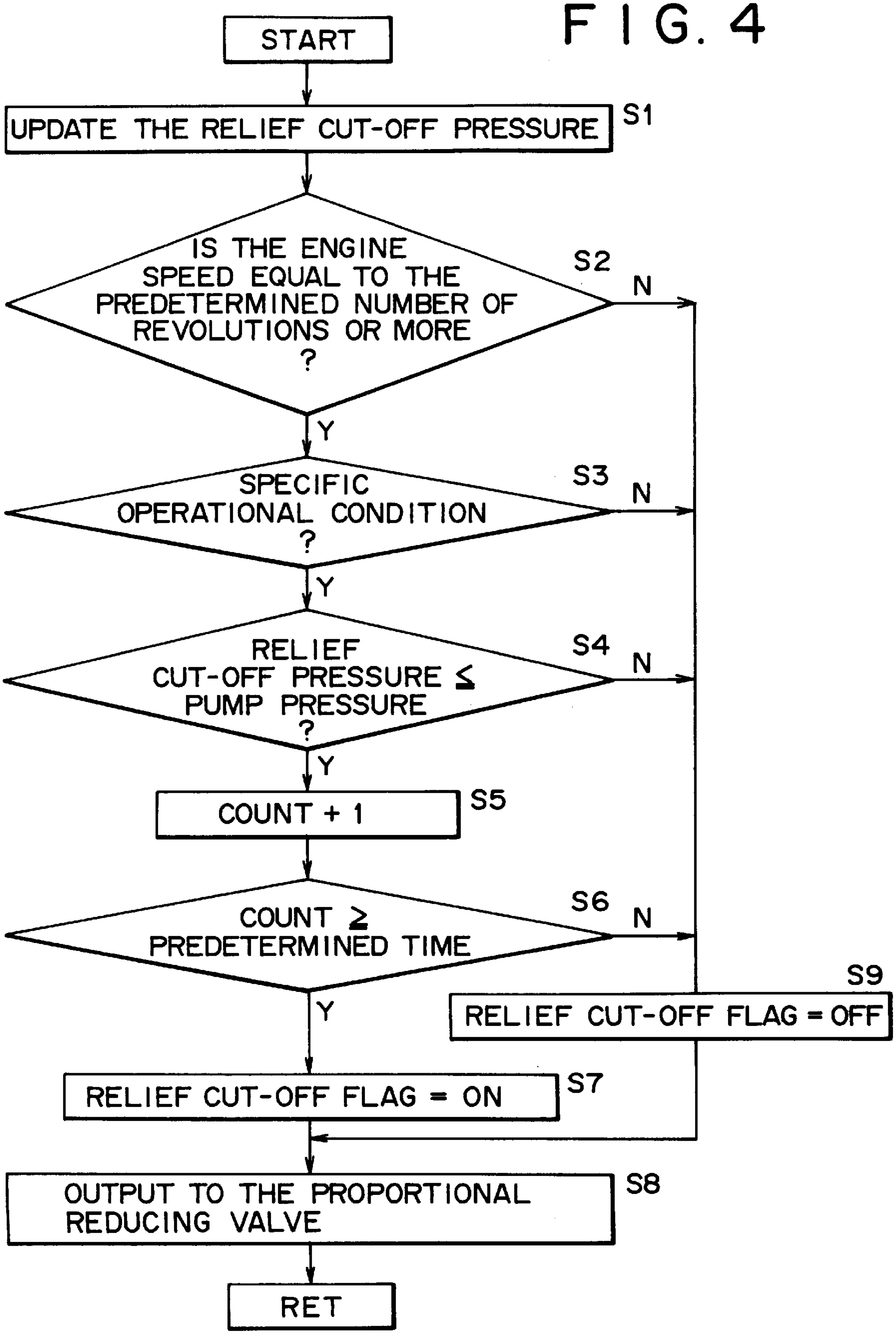
FIG. 4 is a flowchart showing a function related to relief cut-off control ON of the controller.
Figure 5:
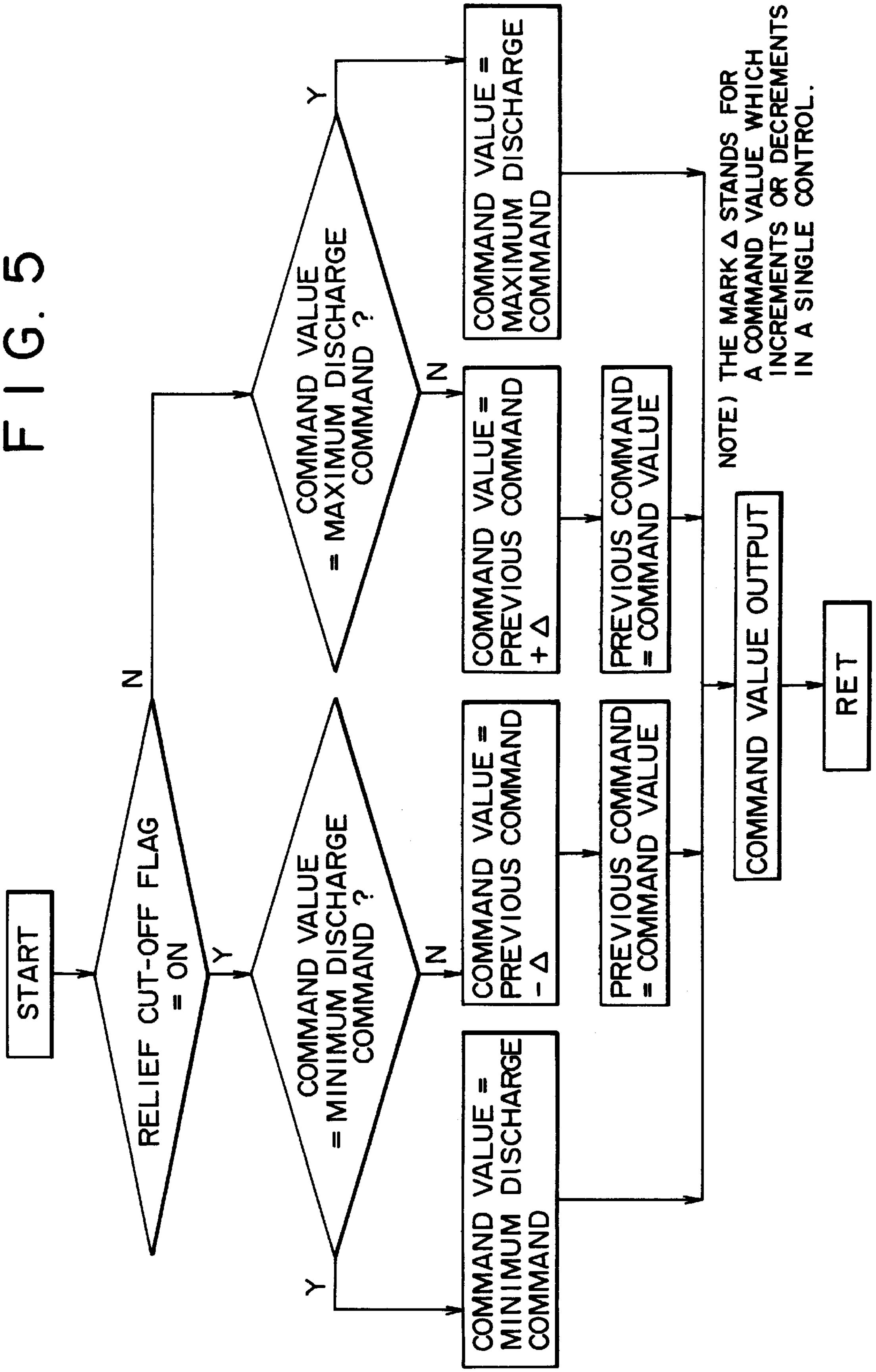
FIG. 5 is a flowchart showing command values of signals outputted from the controller.

FIG. 4 is a flowchart showing a function related to relief cut-off control ON of the controller 27. The following description is now provided on the basis of the conditions set forth in the foregoing second embodiment. After updating of the relief cut-off pressure in the relief valve 19 (S1), if all of the following conditions are satisfied: the revolution of the engine 2 should be not lower than a predetermined number of revolutions (S2), the hydraulic actuator should be in a specific operational condition (S3), and the pump pressure should be not lower than the relief cut-off pressure (S4), and if these conditions are maintained for a predetermined period of time (S5, S6), Relief Cut-off Flag turns ON (S7) and a command value signal is outputted from the controller 27 to the electromagnetic proportional reducing valve 25 (S8). FIG. 5 is a flowchart showing command values of signals outputted to the electromagnetic proportional reducing valve 25 from the controller 27 which performs the relief cut-off control.

Figure 6:
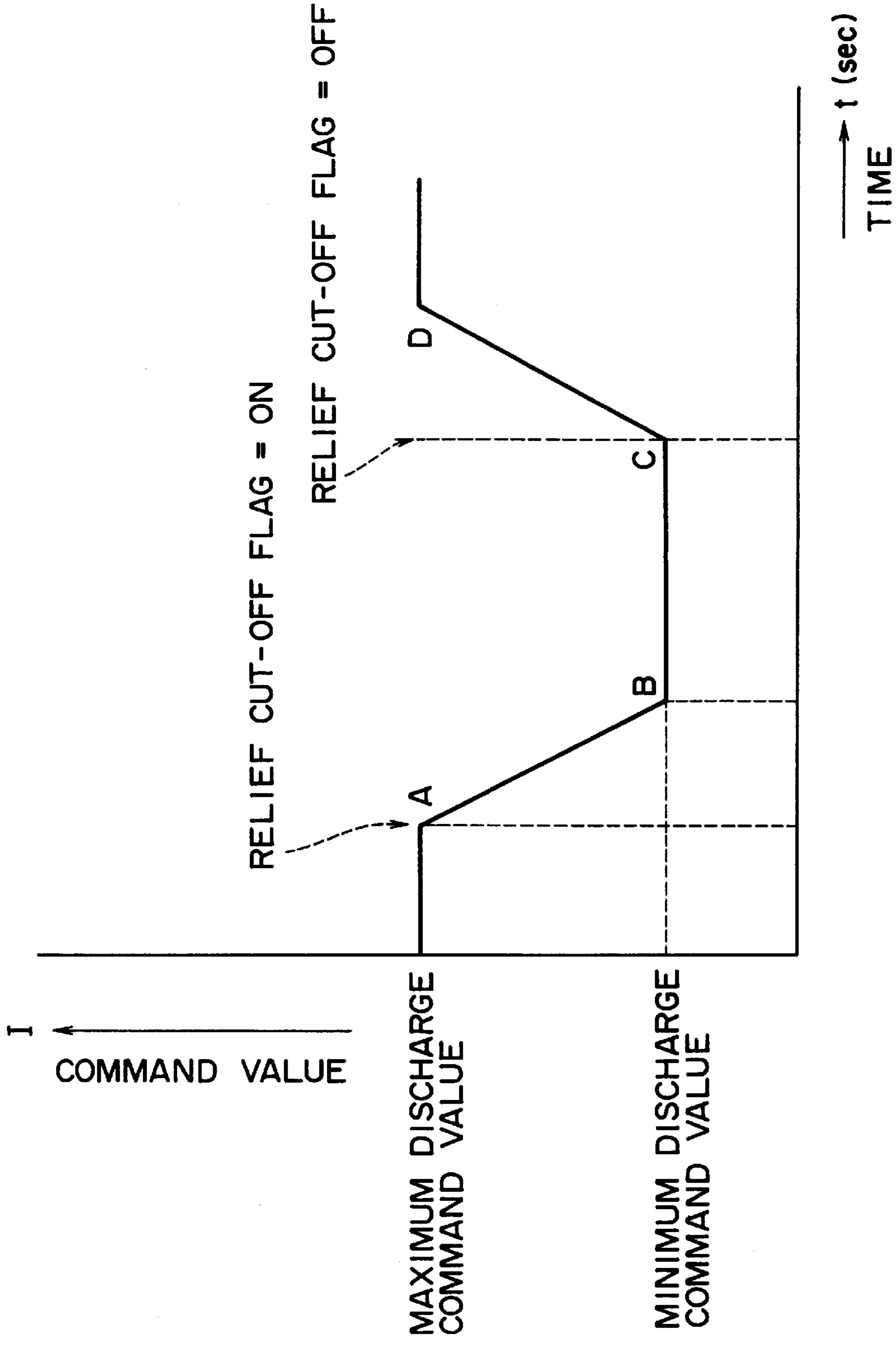
FIG. 6 is a rate limiter diagram of relief cut-off command values outputted from the controller.

When the discharge flow rate of the hydraulic pump 3 is dropped to the relief cut-off flow rate, it may be decreased little by little, and also at the time of canceling the relief cut-off state, the discharge flow rate may be increased little by little. FIG. 6 is a rate limiter diagram of relief cut-off command values outputted from the controller 27 to the electromagnetic proportional reducing valve 25 in the case of causing the relief valve 19 to perform a relief cut-off operation. As shown in the same figure, when the pump discharge flow rate is the maximum discharge and when the relief valve 19 started a relief cut-off operation at time point A (Relief Cut-off Flag=ON), a maximum discharge command value becomes a small value in proportion to the lapse of time t and a time point B corresponding to a minimum discharge command value is reached. Then, after the lapse of a predetermined time t, if the relief cut-off operation is completed at time point C (Relief Cut-off Flag=OFF), a minimum discharge command value at time point C becomes a large value in proportion to the lapse of time t and a time point D corresponding to the maximum discharge command value is reached. Thus, the command values are outputted so as to prevent a stepped sudden decrease or increase of a change in pump discharge flow rate, in other words, so as to decrease or increase the pump discharge little by little, therefore, when the relief valve 19 performs a relief cut-off operation during operation of the hydraulic excavator, it is possible to eliminate "a sense of incongruity" or "an extinct-of-force feeling" of the operator of the hydraulic excavator.

Although this flow rate control device according to the present invention is applied to a negative control type hydraulic circuit as a hydraulic circuit in the hydraulic excavator, it is applicable not only to a negative control type hydraulic circuit but also to a positive control type hydraulic circuit.

I claim:

1. A flow rate control device in a hydraulic excavator, comprising:

a hydraulic pump which is driven rotatively by an engine;

a hydraulic actuator which is driven by a hydraulic oil discharged from said hydraulic pump;

a control valve which controls the supply of the hydraulic oil to said hydraulic actuator;

an operating means which operates said control valve so as to change over the valve from one position to another;

a relief valve disposed in a discharge oil path extending from said hydraulic pump to limit the maximum pressure in said discharge oil path;

an operational condition detecting means for detecting an operational condition of said hydraulic actuator;

a pump pressure detecting means for detecting the discharge pressure of the hydraulic oil discharged from said hydraulic pump;

a flow rate adjusting means for adjusting the discharge flow rate of the hydraulic oil discharged from said hydraulic pump; and a control means to which are inputted detection signals from both said operational condition detecting means and said pump pressure detecting means, wherein when a specific operational condition of said hydraulic actuator is detected and said discharge pressure is held at a predetermined relief cut-off pressure or higher for a predetermined period of time, said control means makes control so that the discharge flow rate of the hydraulic oil discharged from said hydraulic pump is decreased to a relief cut-off pressure by said flow rate adjusting means.

2. A flow rate control device in a hydraulic excavator according to claim 1, wherein said specific operational condition of said hydraulic actuator indicates either a condition such that an attachment to the hydraulic excavator, which is driven by the hydraulic actuator, is a predetermined type attachment or a condition such that said operating means is operated a predetermined amount or more.

3. A flow rate control device in a hydraulic excavator according to claim 1, further comprising an engine revolution detecting means for detecting the state of engine rotation and outputting a detected signal to said control means, and wherein when the specific operational condition of said hydraulic actuator is detected and said discharge pressure is held at the relief cut-off pressure or higher for the predetermined period of time, further, when it is detected by said engine revolution detecting means that the number of revolutions of the engine is in a predetermined high revolution condition, said control means makes control so that the discharge flow rate of the hydraulic oil discharged from said hydraulic pump is decreased to the relief cut-off flow rate by said flow rate adjusting means.

4. A flow rate control device in a hydraulic excavator according to claim 3, wherein said predetermined high revolution condition indicates either a condition such that the engine revolution is held at a predetermined number of revolutions or higher for a predetermined period of time or a condition such that the operational position of a throttle level for setting the engine speed is set to a high speed side.

5. A flow rate control device in a hydraulic excavator according to claim 1, further comprising a work mode setting means for setting drive characteristics of the engine, hydraulic pump, etc. as work modes and inputting a set signal to said control means, and wherein when the specific operational condition of said hydraulic actuator is detected and said discharge pressure is held at the predetermined relief cut-off pressure or higher for a predetermined period of time, further, when a predetermined work mode is set by said work mode setting means, said control means makes control so that the discharge flow rate of the hydraulic oil discharged from said hydraulic pump is decreased to the relief cut-off flow rate by said flow rate adjusting means.

6. A flow rate control device in a hydraulic excavator according to claim 1, wherein when the discharge flow rate of the hydraulic oil discharged from said hydraulic pump is decreased to the relief cut-off flow rate, it is decreased gradually, and when the relief cut-off state is to be canceled, said discharge flow rate is increased gradually.

7. In a flow rate control device in a hydraulic excavator, comprising:

a hydraulic pump which is driven rotatively by an engine;

a hydraulic actuator which is driven by a hydraulic oil discharged from said hydraulic pump;

a control valve which controls the supply of the hydraulic oil to said hydraulic actuator;

an operating means which operates said control valve so as to change over the valve from one position to another; and a relief valve disposed in a discharge oil path extending from said hydraulic pump to limit the maximum pressure in said discharge oil path, the improvement further comprising:

an operational condition detecting means for detecting an operational condition of said hydraulic actuator;

a pump pressure detecting means for detecting the discharge pressure of the hydraulic oil discharged from said hydraulic pump;

a control means to which are inputted detection signals from both said operational condition detecting means and said pump pressure detecting means; and a flow rate adjusting means which, in accordance with an output signal provided from said control means, adjusts the discharge flow rate of the hydraulic oil discharged from said hydraulic pump, and wherein:

when a specific operational condition of said hydraulic actuator is detected and said discharge pressure is held at a predetermined relief cut-off pressure or higher for a predetermined period of time, said control means makes control so that the discharge flow rate of the hydraulic oil discharged from said hydraulic pump is decreased to a relief cut-off pressure by said flow rate adjusting means.

* * * * *

UNITED STATES PATENT AND TRADEMARK OFFICE

CERTIFICATE OF CORRECTION

PATENT NO. : 6,202,411 B1
DATED : March 20, 2001
INVENTOR(S) : Yamashita

It is certified that error appears in the above-identified patent and that said Letters Patent is hereby corrected as shown below:

Title page,
Item (73), the Assignee's information is incorrect. Item (73) should read as follows:

(73) Assignee: Kabushiki Kaisha Kobe Seiko Sho (Kobe Steel, Ltd.) Kobe (JP)

Signed and Sealed this

Twenty-eighth Day of August, 2001

*Attest:*

Nicholas P. Godici

NICHOLAS P. GODICI

*Attesting Officer*

*Acting Director of the United States Patent and Trademark Office*